United States Patent [19]

Nitta

[11] Patent Number: 4,851,654
[45] Date of Patent: Jul. 25, 1989

[54] IC CARD

[75] Inventor: Tsuneo Nitta, Yokohama, Japan

[73] Assignee: Kabushiki Kaisha Toshiba, Kawasaki, Japan

[21] Appl. No.: 199,762

[22] Filed: May 27, 1988

[30] Foreign Application Priority Data

May 30, 1987 [JP] Japan ............................. 62-136308

[51] Int. Cl.⁴ ........................................... G06K 19/06
[52] U.S. Cl. .................................... 235/492; 235/379
[58] Field of Search .............................. 235/492, 379

[56] References Cited

U.S. PATENT DOCUMENTS 3,971,916  7/1976  Moreno .
4,559,418  12/1985 Imai .
4,641,374  2/1987  Oyama .
4,760,245  7/1988  Fukaya .............................. 235/379

OTHER PUBLICATIONS

The High Sensitivity Ceramic Microphone Incorporated with Multiple Poling System, Imai, Nobuomi (Primo Co., Ltd.) pp. 355-356 (Japanese Language Document).

Primary Examiner—Harold I. Pitts
Attorney, Agent, or Firm—Cushman, Darby & Cushman

[57] ABSTRACT

An IC card used for identifying an individual, has a key pad on the surface, a memory for storing a program and data, and a planar microphone and speaker. Speech corresponding to data or a command is converted into signals by a microphone. These signals can be supplied to an output terminal of the IC card under control of the IC card.

Alternatively, the IC card can store or analyze the speech and generate a corresponding command or data.

As the number of functions of the IC card is increased, the number of commands must also be increased. By inputting commands or data by voice instead of dedicated function keys, the number of necessary keys is reduced and convenience is enhanced.

32 Claims, 7 Drawing Sheets

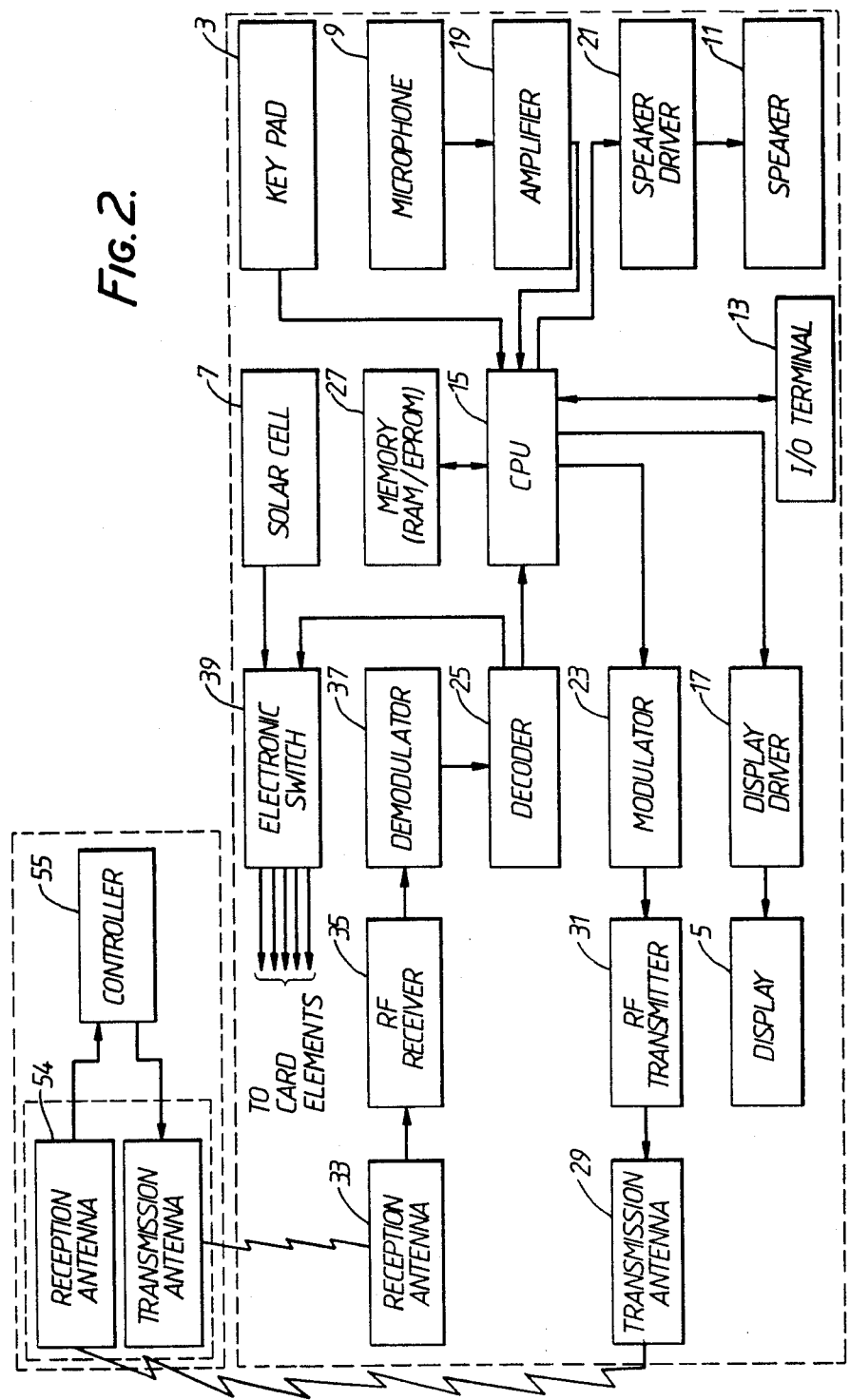

IC CARD

BACKGROUND OF THE INVENTION

The present invention relates to an IC card which has a CPU and a memory. The IC card can execute many functions by virtue of its CPU and memory.

It has been well known to place a keyboard on an IC card. The IC card can then execute functions corresponding to commands inputted from the keyboard.

As the level of technology advances, IC cards can execute more functions. Correspondingly there are more commands associated with these functions.

For example, the code of 0001 indicates INPUT. Users must remember this code and push appropriate keys. Generally, most users find this inconvenient. It is more convenient to provide a separate key corresponding to each function of the IC card. However, more space is needed on such a smart card for many keys, corresponding to the many functions.

The merit of an IC card is portability. Users neither need nor want larger cards. The size of the IC card must be small. Therefore, little space for keys exists on an IC card.

SUMMARY OF THE INVENTION

It is accordingly, an object of the present invention to provide an IC card on which commands can be inputted easily.

It is another object of the present invention to provide an IC card which transmits to other equipment easily.

It is another object of the present invention to provide an IC card system with enhanced security and convenience.

These and other objects of the present invention are achieved by a speech input means disposed in a pocket-sized card. In the card there is processing means which produces a processed signal from a signal inputted by the speech input means. According to this invention, inputting is done not by a keyboard but by speech input means. This permits fewer keys on the IC card, and inputting is accomplished more easily.

BRIEF DESCRIPTION OF THE DRAWINGS

FIG. 2 shows overall block diagram of the apparatus shown in FIGS. 1A and 1B;

DETAILED DESCRIPTION OF THE PREFERRED EMBODIMENT

Figure 1A:
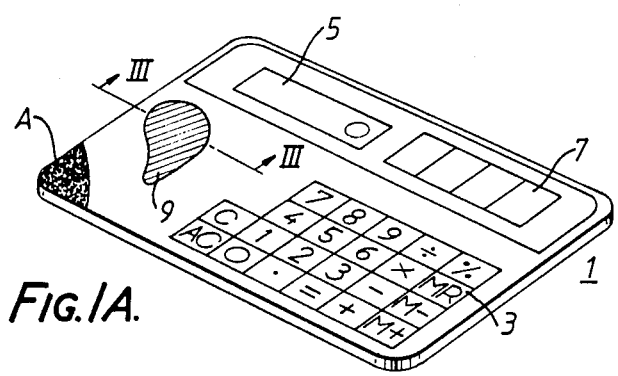
FIGS. 1A and 1B show opposite sides of the external appearance of a preferred embodiment of the IC card of the present invention.
Figure 1B:
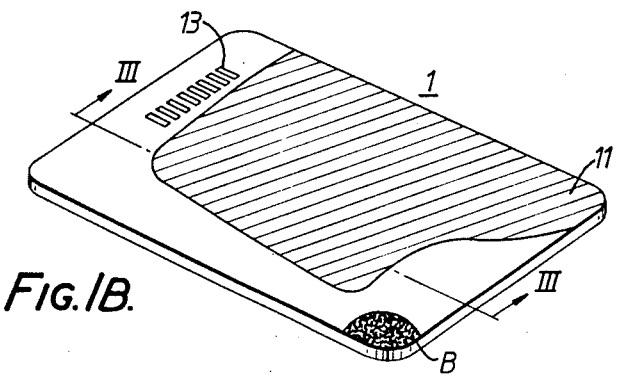

Referring now to the drawings, like reference characters designate identical or corresponding parts throughout the several views. FIGS. 1A and 1B show the external appearance of a first embodiment of an IC card. IC card 1 includes on its top side key pad 3 by which data or commands are inputted, a display 5 which displays these data or commands if necessary, and a solar cell 7 for providing power. In this embodiment, card 1 includes a microphone 9 on the top side and a speaker 11 on the bottom side. Also on the bottom side is an I/O terminal 13.

Referring now to FIG. 2, there is shown an overall block diagram of the apparatus in FIGS. 1A and 1B. CPU 15 controls other elements of the IC card. CPU 15 is connected to key pad 3, I/O terminal 13, a display driver 17, an amplifier 19, a speaker driver 21, a modulator 23, a decoder 25, and a memory 27. Display driver 17 is connected to display 5. Amplifier 19 is connected to microphone 9. Speaker driver 21 is connected to speaker 11. Modulator 23 is connected to a transmission antenna 29 through an RF transmitter 31. Decoder 25 is connected to a reception antenna 33 through an RF receiver 35 and demodulator 37. Decoder 25 is also connected to an electronic switch 39. Electronic switch 39 is connected to solar cell 7. All of the elements illustrated in FIG. 2 are set in IC card 1.

IC card 1, except key pad 3, display 5, microphone 9, speaker 11, I/O terminal 13, display driver 17, amplifier 19, and speaker driver 21, is disclosed in U.S. Pat. No. 4,461,374, and therefore will not be described in any more detail. U.S. Pat. No. 4,461,374 is incorporated herein by reference.

The radio wave signals which are transmitted by transmission antenna 29 and received by reception antenna 33 may include a 16 bit command portion for indicating whether data is to be written or read and a 512 bit data portion. The radio wave signal may also include a sync signal etc. Typical contents of the radio wave signal are as follows:

(a) WRITE MODE: 1111111101111111 (write command) and 110101 . . . 00101 (512 bits data)

(b) READ MODE: 1111111100000000 (read command) and non-data (c) ERASE MODE: 1111111101111111 (write command) and 0000000 . . . 00000 (512 bits all 0)

(d) SPEECH MODE: 0000000001111111 (non-command) and --------------- (speech signal)

CPU 15 writes, reads or erases the data in memory 27 according to the write command, read command or erase command. Memory 27 memorizes data such as the ID member of a holder and the program which CPU 15 executes. CPU 15 sends the speech signal to other elements in card 1. Actually, there are two cases as follows.

(1) speech input by microphone 9

When a card holder utters some words to card 1, microphone 9 receives the speech and transduces it into speech signals. These signals are supplied to RF transmitter 31 by passing modulator 23 under control of CPU 15. RF transmitter 31 transduces these signals from microphone 9 into RF signals. Transmitter 31 supplies transmission antenna 29 with the RF signals. Transmission antenna 29 may be a loop antenna. RF signals are radiated from antenna 29 to the exterior of card 1. When an external device catches the radio wave of RF signals transmitted from antenna 29, the external device discriminates the particular information from card 1 as described later. When a card holder speaks some command or data to be sent to the external device, he does not need to use key pad 3. Therefore, the IC card does not need an excessive number of keys for its many commands or functions.

(2) speech input through reception antenna 33

When an external device radiates an RF signal in any of the write mode, read mode, erase mode or speech mode as described above, reception antenna 33 or card 1 receives it. A reception signal from antenna 33 is supplied to RF receiver 35 which comprises band-pass filters, amplifiers and so on. RF receiver 35 eliminates noises involved in the signals. Signals from RF receiver 35 are supplied to demodulator 37 which demodulates the signals. Specific binary information is extracted from the demodulated signals. This information is supplied to decoder 37. Decoder 37 decodes the instructions or contents of information. Decoded instructions which include the write command, the read command, the erase command and the indication of a non-command are supplied to CPU 15. CPU 15 performs processing according to these instructions. In response to the indication of a non-command (000000001111111), CPU 15 directs signals from receiver 35 to speaker driver 21. Speaker driver 21 drives speaker 11 according to signals following this instruction. When the external device may inform the card holder of a message, the external device radiates the message following the non-command instruction, so that the message is enunciated by speaker 11. Therefore the card holder can receive the message from the external device without seeing it on display 5.

In this embodiment, solar cell 7 functions well for a power source to supply all elements with electricity through electronic switch 39. I/O terminal 13 is used so that data or program can be loaded into IC card 1 initially. Decoder 25 or CPU 15 controls the selection state of electronic switch 39. Electronic switch 39 receives electric power from solar cell 7 and selectively applies power to its output terminals in accordance, with the contents of output from decoder 25 or CPU 15. Although not illustrated in FIG. 2, output terminals of electronic switch 39 are connected to prescribed elements in card 1. The element that must be energized can be supplied with power by electronic switch 39. As described before, U.S. Pat. No. 4,641,374 shows the detail of these elements and their operation.

Figure 3A:
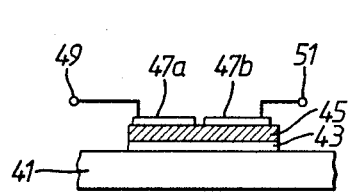
FIG. 3A shows a section of the apparatus taken along the line III—III of FIG. 1A and the line III—III of FIG. 1B looking in the direction of the arrows.
Figure 3B:
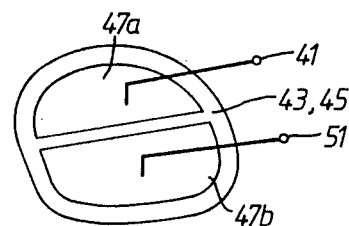
FIG. 3B shows a schematic top plan view of the apparatus of FIG. 3A.

Referring now to FIGS. 3A and 3B of the drawings, there are shown a section and a top view, respectively, for microphone 9 and speaker 11. In this embodiment, microphone 9 and speaker 11 are planar and are of the same electroacoustic transducer construction.

The conceptual structure of an electroacoustic transducer is as follows. A plane electrode 43 is laminated on a card base 41. A piezoelectric ceramic sheet 45 is also laminated on plane electrode 43. A pair of plane electrodes 47a, 47b are laminated on piezoelectric ceramic sheet 45. A pair of leads are connected to either amplifier 19 or speaker driver 21. Details concerning this transducer are disclosed in U.S. Pat. No. 4,559,418.

When the electroacoustic transducer is operating as a microphone, amplifier 19 supplies a pair of plane electrodes with a direct current bias. The piezoelectric ceramic sheet 45 is vibrated by the sound of speech to produce voltage fluctuations. The voltage fluctuations are detected by amplifier 19 through a pair of leads 49 and when 51 operating as speaker 11, speaker driver 21 supplies a voltage to the piezelectric ceramic sheet 45 to produce vibrations in the piezelectric ceramic sheet 45.

In an IC card with planar microphone 9 and speaker 11, an operator must be careful how he holds IC card 1. The characteristic of microphone 9 and speaker 11 will be affected by the area at which the card is held. Referring to FIGS. 1A and 1B of the drawings, actual visible patterns A, B on the surface of card 1 designate good areas for holding card 1 so that the characteristics of microphone 9 and speaker 11 will not be affected.

Figure 4A:
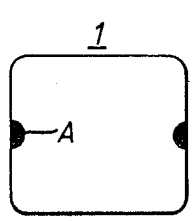
FIGS. 4A–D, 5A and 5B show modifications of the apparatus.
Figure 4B:
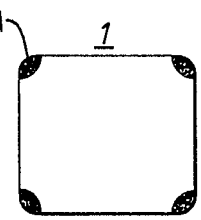
Figure 4C:
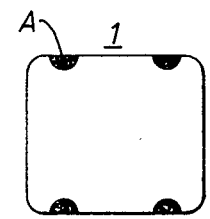
Figure 4D:
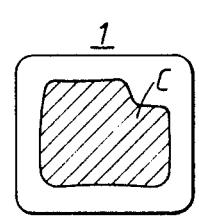

FIGS. 4A–4D of the drawings show other possible embodiments of patterns. FIGS. 4A–4C show pattern A which designate the area which does not affect the characteristic of microphone 9 and speaker 11 so that the card could be held at these locations. FIG. 4D shows pattern C which designates the area which can affect the characteristic of microphone 9 and speaker 11 so that the card should not be held at this location. Of course, in these embodiments, holders might hold the area where microphone 9 and speaker 11 are not located.

Figure 5A:
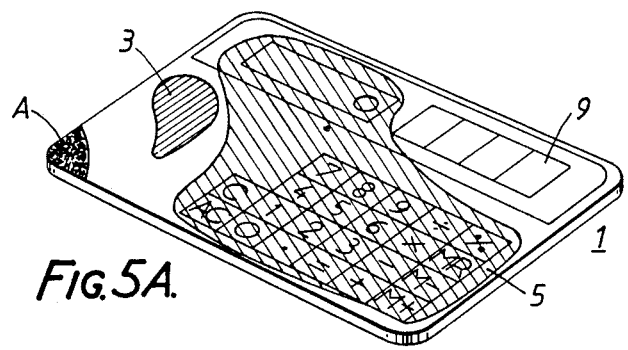
Figure 5B:
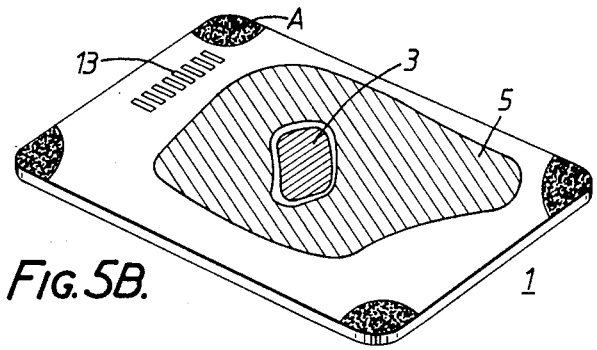

FIGS. 5A, 5B show the external appearance of other embodiments of IC cards with arrangements for microphone 9 and speaker 11. In FIG. 5A speaker 11 is on the top surface extending over displays 5 and key pad 3. In this embodiment, speaker 11 must be transparent and flexible. In FIG. 5B, speaker 11 and microphone 9 are on the bottom surface, with microphone 9 surrounded by speaker 11.

Figure 6:
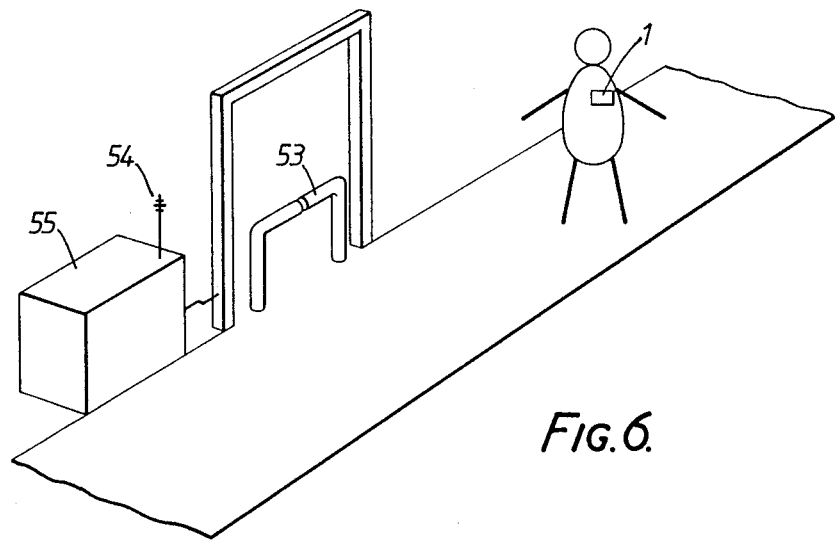
FIG. 6 shows a schematic view of the system employing the apparatus shown in FIGS. 1A and 1B.
Figure 7:
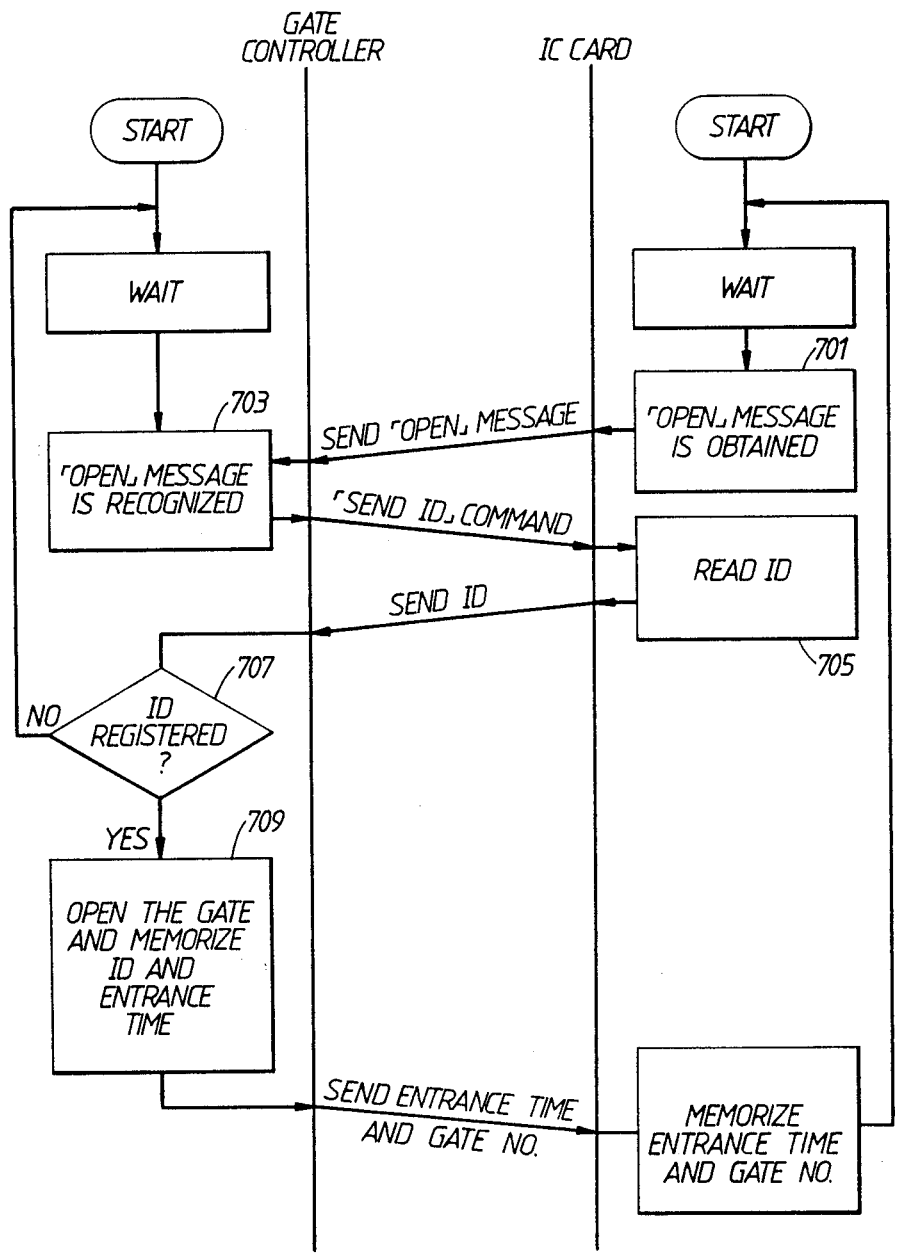
FIG. 7 shows the operation of the system in FIG. 6.

FIG. 6 shows a schematic view of a gate control system using an IC card as previously described; and, FIG. 7 is an operation diagram for the system shown in FIG. 6. This gate control system comprises a gate 53, a gate controller 55 which controls the opening of gate 53, and IC card 1 held by a person desiring to pass. Gate controller has reception and transmission antenna 54, and CPU (not shown in FIG. 6) connected to antenna 54.

An operator can go through enter gate 53 if he follows the correct procedures. If he wants to go through gate 53, he might speak out a command "OPEN" to microphone 9 in IC card 1 at step 701. This "OPEN" message passes through IC card 1 and is transmitted to gate controller 55. Gate controller 55 receives the message by reception and transmission antenna 54 and analyzes its content. Upon recognizing that the message is "OPEN" at step 703, CPU of gate controller 55 transmits a "send ID" command to IC card 1 by antenna 54. "Send ID" command orders IC card 1 to read ID data from memory 27 and output this ID data from IC card 1. Outputting ID means radiating data ready by CPU 15. Therefore, IC card 1, receiving the "send ID" command, reads ID data from memory 27 and radiates a signal corresponding to the ID data read from memory 27 at step 705. When gate controller 55 receives the signal corresponding to the ID data, gate controller 55 checks the ID data to see if that ID data is registered to permit actuating gate 53 at step 707. If the ID data is registered, gate controller 55 opens gate 53, memorizes the ID data and the entrance time in the memory (not shown in FIGS. 6, 7) at step 709. After step 709, gate controller 55 sends the entrance time and the gate number to IC card 1. IC card 1 receives and stores the entrance time and the gate number which specifies the gate.

This system has two merits from the point of view of security. One is security of passing out or in at a special gate. That is, only a card holder whose card stores registered ID data can go through a gate. Another is to check when or through which gate a holder passes. The card stores the entrance time and the gate number which a holder might go through, so the entrance time and the gate number can be read and checked. If a manager needs to check anyone's passing, he takes up anyone's IC card. IC card is read by a card reader (not shown in FIG. 6, 7).

Figure 8:
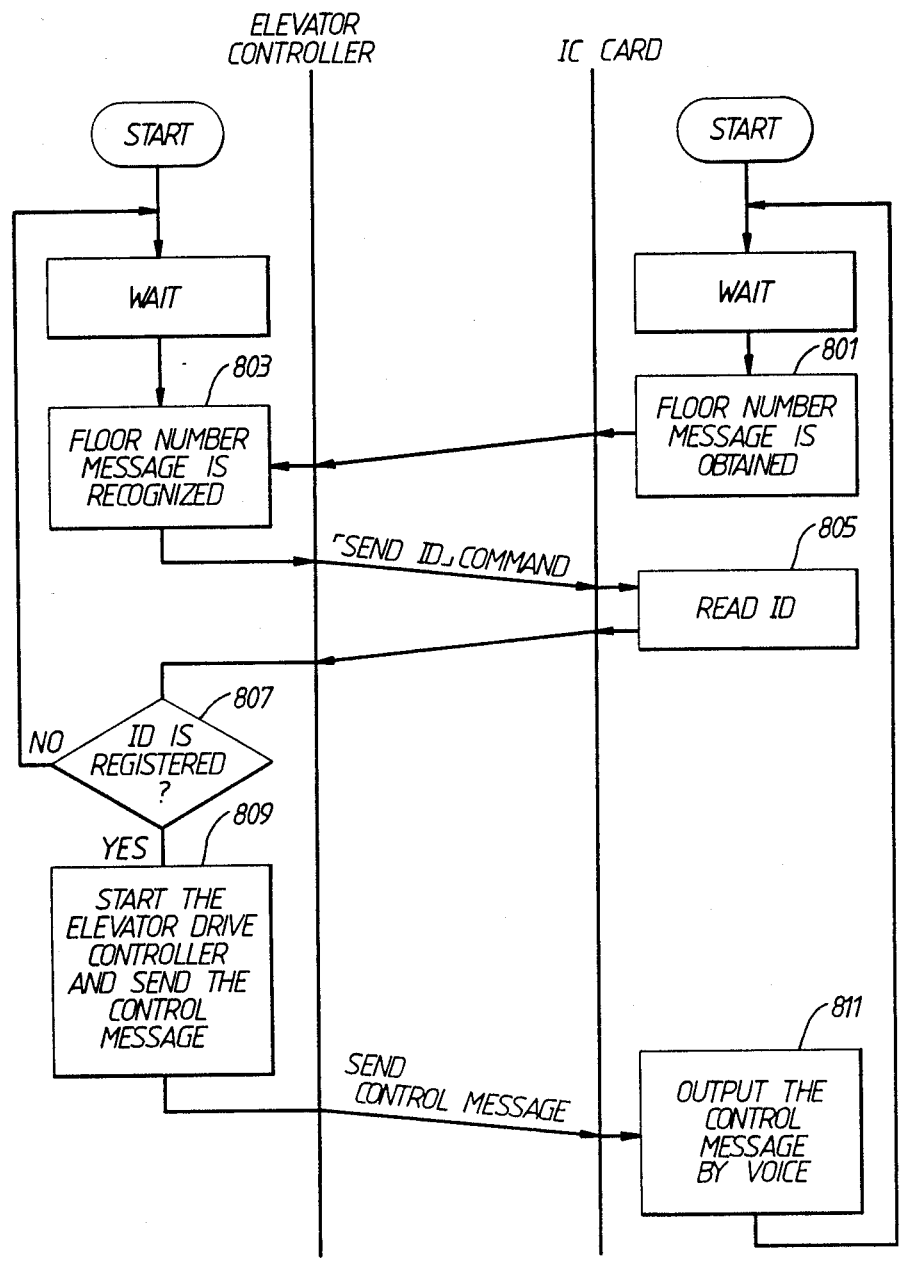
FIG. 8 shows the operation of another system employing the apparatus in FIGS. 1A and 1B.

FIG. 8 is an operation diagram for an elevator control system using an IC card as previously described.

This system employs the same hardware as in FIG. 6 except for gate 53. Gate 53 in FIG. 6 is replaced by an elevator. Corresponding to this replacement, gate controller 55 will be referred to as an elevator controller. If a card holder wants to get on the elevator, he might speak out a floor number, for example "9th floor" to microphone 9 in IC card 1 in front of the elevator.

The "9th floor" message passes through IC card 1 and is transmitted to controller 55 at step 801. The CPU of controller 55 receives the message by antenna 54 and analyses its content at 803. Upon recognizing that the message is "9th floor", the CPU of controller 55 sends a "send ID" command to IC card 1 by antenna 54. "Send ID" command is the same as a "read (ID) and output command." Under a read command, CPU 15 of IC card 1 reads data from memory 27. Under an output command CPU 15 of IC card 1 transmits data ready by CPU 15. Therefore IC card 1, receiving the "Send ID" command, reads ID data from memory 27 and radiates a signal corresponding to the ID data from memory at step 805. When controller 55 receives the signal corresponding to the ID data, controller 55 checks the ID data to see if that ID data is registered to permit actuating the elevator at step 807. If the ID data is registered, controller 55 starts the elevator drive controller at step 809. After this step, the elevator drive controller controls the elevator in the usual way. The elevator cage controlled by elevator drive control gets to the floor where a card holder is, and opens. After a card holder gets on the elevator, the elevator travels to the 9th floor. Only a bit before reaching the 9th floor, the CPU of controller 55 sends the control message code [E(n=9)]. The message code [E(n=9)] means that "This elevator is stopping at the n-th floor. Please get off" (n=9). This message code [E(n=9)] is sent to IC card 1. IC card 1 receives the message code [E(n=9)]. CPU 15 reads the data corresponding to the message code [E(n=9)] from memory 27. Memory 27 memorizes the data for voice synthesizing to drive speaker 11 such that speaker 11 makes sound that "This elevator is stopping at the 9th floor please get off" at step 811.

Figure 9:
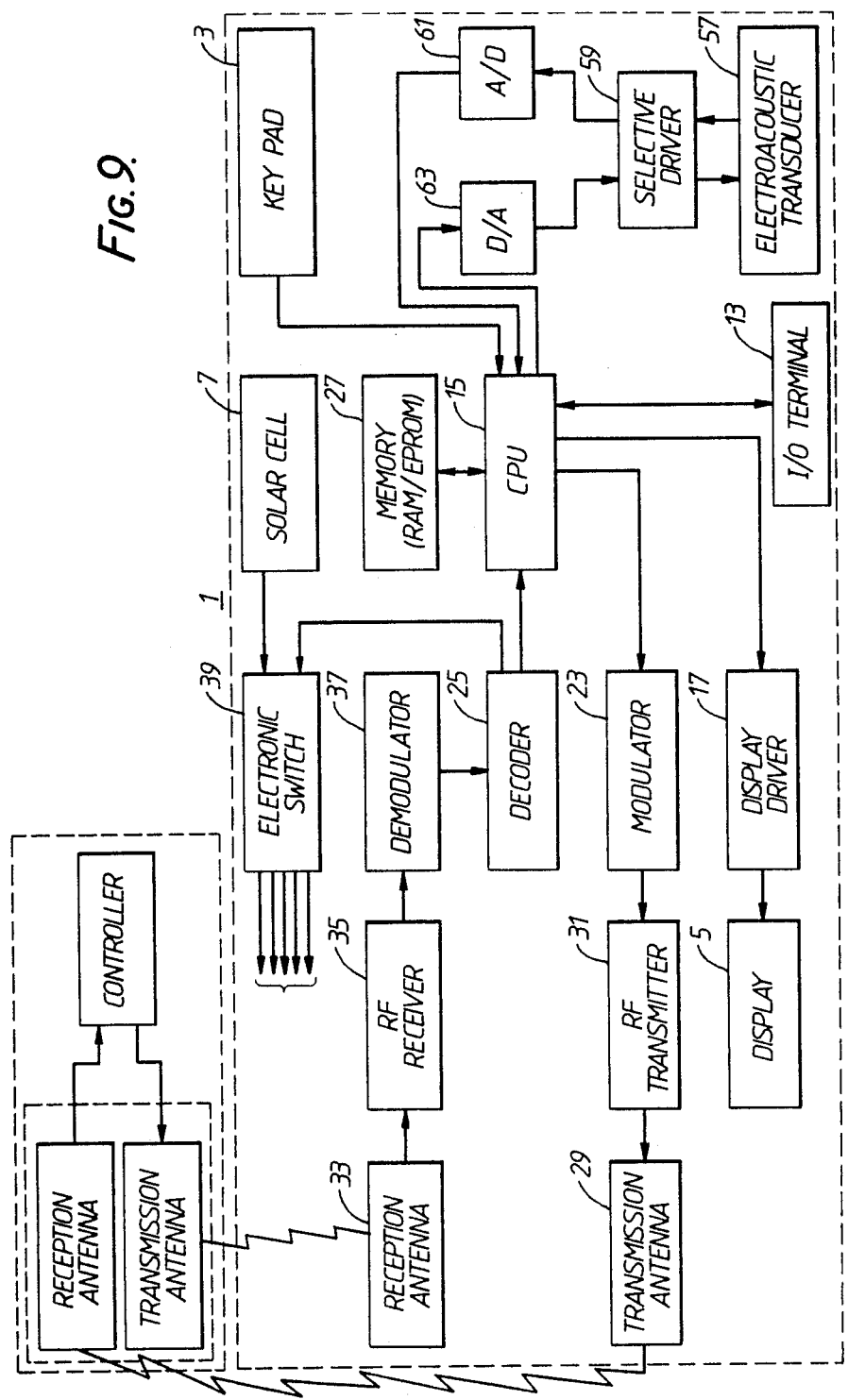
FIGS. 9–11 show an overall block diagram of the apparatus of another embodiment of the invention.

Referring now to FIG. 9 of the drawings, there is shown an overall block diagram of another embodiment of this invention. In this embodiment, electroacoustic transducer 57 is used as both speaker and microphone. This transducer has the same structure as microphone 9 or speaker 11 shown in FIGS. 3A and 3B.

Transducer 57 is connected to a selective driver 59. Selective driver is connected to A/D converter 61 and D/A converter 63. A/D converter 61 and D/A converter 63 are connected to CPU 15.

In the speaker mode, selective driver 59 drives transducer 57 according to the signal from CPU 15 via D/A converter 63. In the microphone mode, selective driver 59 drives transducer 57 to get a signal corresponding to sound and passes the signal to CPU 15 via A/D converter 61.

Selective driver 59 acts as an I/O interface between CPU 15 and transducer 57. The microphone and speaker are transducers between signals and sound in reverse relation. In the speaker mode, selective driver 59 provides a signal to electroacoustic transducer 57. In the microphone mode, selective driver 59 obtains a signal from electroacoustic transducer 57.

In this embodiment, speech is converted to digital signals by A/D converter 61. These digital signals are supplied to CPU 15. In the case that memory 27 stores a program for pattern recognition, CPU 15 might recognize speech inputted, and output commands corresponding to speech. Usually, the information quantity of a command is less than that of digital signals corresponding to speech.

Figure 10:
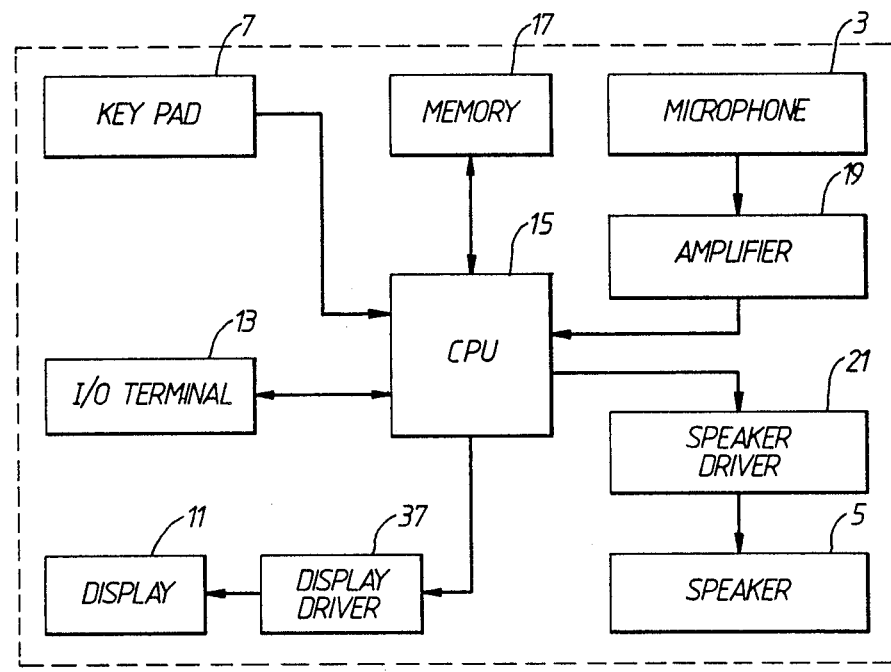
Figure 11:
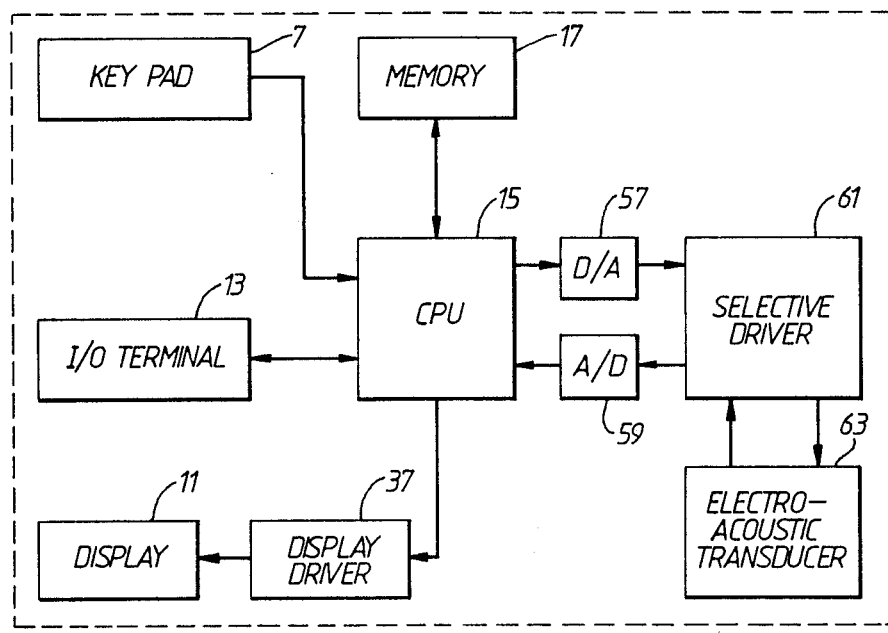

Referring now to FIGS. 10 and 11 of the drawings, there are shown overall block diagrams of other embodiments. In these embodiments, elements for radio transmission are removed from IC cards as shown in FIGS. 2 and 9. That is, IC cards shown in FIGS. 10 and 11 transfer data to the outer device only via I/O terminal 13, for example, an electric connector.

In these embodiments, signals corresponding to inputted speech must be stored in IC card 1 for a time.

Although specific embodiments of this invention have been described in detail above, this invention is not restricted to these embodiments. The thickness of the IC card is arbitrary. In these embodiments, signals corresponding to messages inputted by microphone are passed through IC card 1. Signals may be stored in memory 27 in IC card 1. When speech is inputted to IC card 1, signals corresponding to speech may be stored in memory 27 for a short time or a long time and then read from memory 27, and transmitted to the outer device. If IC card 1 is to be used as an independent terminal, I/O terminal 13 and antenna 29 is not needed. It is practical to use a keyboard for inputting when speech cannot be input well by microphone.

What is claimed is:

1. An IC card comprising;
   a pocket-sized card;
   speech input means, connected to said card, for converting speech into a signal;
   means, connected to said card, for processing said signal to produce a processed signal; and
   means, connected to said card, for outputting said processed signal from said card.

2. An IC card according to claim 1, wherein said processing means includes A/D converter means for converting speech into digital signal 3. An IC card according to claim 1, wherein said processing means further comprises memory means for storing said signal from said speech input means.

4. An IC card according to claim 1, wherein said processing means includes a CPU.

5. An IC card according to claim 1, further comprising a holding pattern made on said card, for indicating an area to be held so that a characteristic of said speech input means is not affected adversely.

6. An IC card according to claim 1, further comprising a holding pattern made on said card overlapping said speech input means, for indicating an area not to be held so that a characteristic of said speech input means is affected adversely.

7. An IC card according to claim 1, further comprising speaker means, connected to said card, for making sound in response to said processed signal.

8. An IC card according to claim 7, wherein said speaker means is planar.

9. An IC card according to claim 1, wherein said speech input means is planar.

10. An IC card comprising:
a pocket-sized card;
speech input means connected to said card, for converting speech into a signal;
memory means, connected to said card, for memorizing said signal; and
means, connected to said card, for outputting said signal from said card.

11. An IC card according to claim 10, wherein said outputting means includes means for transmitting said signal from said card.

12. An IC card according to claim 10, wherein said outputting means includes an electrical connection.

13. An IC card according to claim 10, further comprising means connected to said card, for inputting data, said inputting means including an electrical connection.

14. An IC card according to claim 10, further comprising A/D converter means, connected to said card, for converting said signal into a digital signal, said memory means being responsive to said signal.

15. An IC card comprising:
a pocket-sized card;
memory means, connected to said card, for storing a program and data;
a microprocessor, connected to said card, for functioning according to said program; and
speech input means, connected to said card, for converting speech into a signal, which is used in executing said program by said microprocessor.

16. An IC card according to claim 15, further comprising outputting means, connected to said card, for outputting said signal.

17. An IC card according to claim 16, wherein said outputting means includes transmitter means for transmitting signals by radio waves.

18. An IC card according to claim 16, wherein said outputting means includes an electric connector.

19. An IC card according to claim 15, wherein said microprocessor includes means for analyzing said signal from said speech input means to produce an analyzed signal.

20. An IC card according to claim 19, further comprising transmitting means, connected to said card, for transmitting said analyzed signal from said card.

21. An IC card according to claim 19, further comprising an electric connector, connected to said card, for outputting said analyzed signal from said card.

22. An IC card according to claim 15, further comprising speaker means for making sound in response to signals supplied from at least one of said microprocessor and said speech input means.

23. An IC card according to claim 15, further comprising:
means connected to said card, for inputting an electric signal; and
means connected to said card, for supplying said electric signal to at least one of said microprocessor and said memory.

24. An IC card according to claim 23, wherein said inputting means includes receiver means for receiving a radio wave signal.

25. An IC card according to claim 15, further comprising a holding pattern made on said card for indicating an area to be held so that a characteristic of said speech input means is not affected adversely.

26. An IC card according to claim 15, further comprising a holding pattern made on said card overlapping said speech input means for indicating an area not to be held so that a characteristic of said speech input means is not affected adversely.

27. An IC card system comprising:
a pocket-sized card;
speech input means, connected to said card, for converting speech into a signal;
means, connected to said card, for processing said signal to produce a processed signal;
means, connected to said card, for outputting said processed signal from said card;
controller means for receiving said output processed signal and producing a control signal related thereto; and
means for actuating a device in response to said control signal.

28. An IC card system according to claim 26, further comprising:
means for transmitting a code signal in said controller means; and
means for receiving said code signal on said card.

29. An IC card system according to claim 28, wherein said controller means further comprising means for analyzing said output processed signal.

30. An IC card system according to claim 27, wherein:
said processing means includes means for analyzing said signal and produce commands; and
said controller means includes means for accepting said commands.

31. An IC card system according to claim 27, further comprising means, connected to said card, for storing at least one of said signal and said processed signal.

32. An IC card system according to claim 27, wherein said memory means store the time when said IC card is used.

* * * * *